(12) United States Patent
Tsuchiiwa et al.

(10) Patent No.: US 10,669,883 B2
(45) Date of Patent: Jun. 2, 2020

(54) STEAM-USING FACILITY MONITORING SYSTEM

(71) Applicant: TLV Co., Ltd., Kakogawa-shi (JP)

(72) Inventors: Noriaki Tsuchiiwa, Kakogawa (JP); Tomoyuki Shiraishi, Kakogawa (JP)

(73) Assignee: TLV Co., Ltd., Hyogo (JP)

( * ) Notice: Subject to any disclaimer, the term of this patent is extended or adjusted under 35 U.S.C. 154(b) by 186 days.

(21) Appl. No.: 15/312,308

(22) PCT Filed: May 22, 2015

(86) PCT No.: PCT/JP2015/064786
§ 371 (c)(1),
(2) Date: Nov. 18, 2016

(87) PCT Pub. No.: WO2015/178487
PCT Pub. Date: Nov. 26, 2015

(65) Prior Publication Data
US 2017/0081976 A1    Mar. 23, 2017

(30) Foreign Application Priority Data

May 23, 2014 (JP) .................................. 2014-107079

(51) Int. Cl.
*F01D 21/00* (2006.01)
*F01D 21/14* (2006.01)
(Continued)

(52) U.S. Cl.
CPC ........... *F01D 21/003* (2013.01); *F01D 21/00* (2013.01); *F01D 21/14* (2013.01); *F01D 25/00* (2013.01);
(Continued)

(58) Field of Classification Search
CPC .. F01D 25/00; F01D 25/32; F16T 1/48; F01K 13/02; F10D 21/003; F10D 21/00; F10D 21/14
See application file for complete search history.

(56) References Cited

U.S. PATENT DOCUMENTS 8,573,250 B1 * 11/2013 Radle ........................ F16T 1/12
137/183
2010/0294377 A1   11/2010 Aloni et al.
(Continued)

FOREIGN PATENT DOCUMENTS

JP          61282903 A     12/1986
JP           6282396 A      4/1987
(Continued)

*Primary Examiner* — Catherine T. Rastovski
(74) *Attorney, Agent, or Firm* — The Webb Law Firm (57) ABSTRACT

Suitability of an operational state of a steam-using equipment is accurately estimated to allow for early detection of a sign of abnormality in the steam-using equipment. A steam-using facility monitoring system composed of a steam-using equipment includes a control state detector that detects a state of a steam controller provided in a steam pipe accompanying the steam-using equipment, and an operational state estimating means having a signal input unit that inputs a detection signal from the control state detector and an operational state estimation unit that estimates the operational state of the steam-using equipment based on one inputted detection signal or a preset particular combination of detection signals.

12 Claims, 5 Drawing Sheets

(51) Int. Cl.
  *F01D 25/32* (2006.01)
  *F16T 1/48* (2006.01)
  *F01D 25/00* (2006.01)
  *F01K 13/02* (2006.01)

(52) U.S. Cl.
  CPC ............... *F01D 25/32* (2013.01); *F16T 1/48* (2013.01); *F01K 13/02* (2013.01)

(56) References Cited

U.S. PATENT DOCUMENTS

| | | | | |
|---|---|---|---|---|
| 2011/0060567 | A1* | 3/2011 | Fujiwara | F01K 13/02 703/6 |
| 2011/0100488 | A1* | 5/2011 | Somrah | F16T 1/34 137/544 |
| 2011/0236842 | A1* | 9/2011 | Ecock | F24D 10/00 432/1 |
| 2012/0166142 | A1 | 6/2012 | Maeda et al. | |
| 2012/0290879 | A1 | 11/2012 | Shibuya et al. | |
| 2012/0312016 | A1* | 12/2012 | Lawes | F03G 7/04 60/641.5 |
| 2012/0316835 | A1 | 12/2012 | Maeda et al. | |
| 2014/0102100 | A1* | 4/2014 | Bindingnavale Ranga | F01K 7/345 60/646 |

FOREIGN PATENT DOCUMENTS

| | | | |
|---|---|---|---|
| JP | H0369899 | * | 3/1991 |
| JP | 9287408 | A | 11/1997 |
| JP | 2009052412 | A | 3/2009 |
| JP | 2010204801 | A | 9/2010 |
| JP | 2010281238 | A | 12/2010 |
| JP | 2011059790 | A | 3/2011 |
| JP | 2011070635 | A | 4/2011 |
| JP | 2011141188 | A | 7/2011 |
| JP | 2011145846 | A | 7/2011 |
| JP | 2011196997 | A | 10/2011 |

* cited by examiner

STEAM-USING FACILITY MONITORING SYSTEM

CROSS-REFERENCE TO RELATED APPLICATIONS

This application is the United States national phase of International Application No. PCT/JP2015/064786 filed May 22, 2015, and claims priority to Japanese Patent Application No. 2014-107079 filed May 23, 2014, the disclosures of which are hereby incorporated in their entirety by reference.

TECHNICAL FIELD

The present invention relates to a steam-using facility comprised of a steam-using equipment.

BACKGROUND ART

In a steam-using facility comprised of a steam-using equipment, in the event of failure of the steam-using equipment, repair or replacement of this steam-using equipment, moreover, stop of the operation of the steam-using facility associated with such repair or replacement is required. This entails repair cost or replacement cost, and also results in loss of profit which would be obtained originally from the operation of the steam-using facility. Thus, there will occur significant loss.

According to a conventional practice implemented to address to the problem above, the state of the steam-using equipment (e.g. a rotational speed in the case of a steam turbine) or a steam state such as a steam pressure or steam flow rate of steam coming in/out of the steam-using equipment is on-line monitored. So that, based on a change in these, abnormality in the steam-using equipment is detected before it causes a failure of the steam-using equipment, whereby development of the problem to failure of the steam-using equipment is inhibited.

SUMMARY

Problem to be Solved by Invention

However, abnormality detected by the above-described conventional method is abnormality due to a certain inconvenience already occurring in the steam-using equipment. Thus, even though abnormality in an operational state of the steam-using equipment is sensed for preventing its development to failure of the steam-using equipment, the certain inconvenience has already occurred in the steam-using equipment. As a result, for checking or coping with the inconvenience, it is necessary to stop a part or all of the operation. Thus, loss due to operation stop could not be avoided.

In view of the above-described state of the art, the principal object of the present invention is to provide a steam-using facility monitoring system capable of accurately estimating suitability of an operational state of a steam-using equipment to allow for early sensing of a sign of abnormality in the steam-using equipment.

Solution

A steam-using facility monitoring system comprised of a steam-using equipment according to the present invention comprises:

a control state detector that detects a state of a steam controller provided in a steam pipe accompanying the steam-using equipment; and an operational state estimating means having a signal input unit that inputs a detection signal from the control state detector and an operational state estimation unit that estimates the operational state of the steam-using equipment based on one inputted detection signal or a preset particular combination of detection signals.

According to a finding made by the present inventors, in monitoring of a steam-using facility comprised of a steam-using equipment, if estimation of an operational state of the steam-using equipment is implemented by monitoring a state of a steam controller, the estimation of the operational state of the steam-using equipment is made possible from a novel viewpoint not found in the convention. Here, the language "steam-using equipment" is understood to represent a component exemplified by a steam turbine, a heater, a heat exchanger, etc. that consumes steam for a particular purpose such as turbine rotation or heat exchange.

For instance, if abnormality develops in a steam controller (e.g. a steam trap for collecting drain such as condensed water in steam, a valve for controlling direction or amount of steam running in a steam pipe, a strainer for removing foreign substance present in steam, etc.) for controlling state of steam coming in/out of the steam-using equipment, this will lead to occurrence of unsuitability of the steam coming in/out of the steam-using equipment for an operation of this steam-using equipment (for instance, excessive amount of drain in the steam pipe which gives a significant load on the steam-using equipment or introduction of more than expected amount of steam into the steam-using equipment, etc.); consequently, the risk of failure occurrence in the steam-using equipment becomes high. Further, also when abnormality develops in a "peripheral" equipment of the steam-using equipment other than the steam controller, in association with this abnormality, a certain abnormality will appear in the steam controller before a failure in the steam-using equipment eventually occurs. Conventionally, after occurrence of inconvenience in the steam-using equipment, abnormality in the operational state of the steam-using equipment would be detected. In contrast, with the novel concept of monitoring of a state of the steam controller, abnormality in the operational state of the steam-using equipment can be sensed in advance at the time of occurrence of abnormality in the steam controller which precedes occurrence of inconvenience in the steam-using equipment.

Further, if determination is made not only on abnormality of the steam controller per se, but made in combination with determination of individual state of the steam controller or a combination of states of a plurality of steam controllers, it becomes also possible to determine the suitability of the steam (suitability of its temperature, drain amount, etc.) coming in/out of the steam-using equipment or to determine whether the steam-using equipment is allowing appropriate passage of steam or not. So that, suitability of the operational state of the steam-using equipment can be estimated from such viewpoint of possibility of abnormality occurrence in future, such as whether the steam-using equipment should be allowed to continue its operation as it is or whether there is risk of development of inconvenience with continued operation or not, etc.

Namely, with the above-described arrangement, the control state detector detects a state of the steam controller, and in the operational state estimating means, the operational state of the steam-using equipment is estimated based on one inputted detection signal or a preset particular combination of detection signals detected by the control state detector. So, it becomes possible to determine whether continued operation of the steam-using equipment if allowed will cause a problem or not, or whether the continued operation will lead to development of inconvenience or not, etc. Thus, the suitability of an operational state of the steam-using equipment including possibility of occurrence of abnormality in future can be accurately estimated. Further, based on abnormality in the steam controller preceding development of inconvenience in the steam-using equipment, sign of abnormality in the steam-using equipment can be sensed early.

And, with the above-described possibility of accurate estimation of an operational state of the steam-using equipment and early sensing of sign of abnormality in the steam-using equipment, it becomes possible to speedily and timely cope with abnormality before stopping of a part or entire steam-using facility becomes necessary. With this, loss due to operation stop can be effectively reduced. Further, with early coping with abnormality, operational loss due to abnormality occurring until coping can be effectively reduced and damage to the steam-using facility associated with the abnormality in the steam-using equipment or the like too can be effectively reduced.

Next, preferred embodiments of a steam-using facility evaluation system relating to this disclosure will be explained. It is understood however that the embodiments disclosed below will not limit the scope of this disclosure.

According to one embodiment, preferably, the steam controller includes a steam trap and the control state detector includes a trap state detector for detecting a state of the steam trap.

Namely, with the above-described arrangement, by applying a steam trap many of which are installed in the steam-using facility as the steam controller to the monitoring system of this disclosure, the operational state of the steam-using equipment can be estimated based on detection signals detected from the many steam traps, so that the operational state of the steam-using equipment can be estimated even more accurately. Further, the early sensing of a sign of abnormality in the steam-using equipment can be made even more reliably.

According to one embodiment, preferably, a steam state detector is provided for detecting a steam state in the steam pipe;

the signal input unit inputs also a detection signal from the steam state detector; and the operational state estimation unit estimates the operational state of the steam-using equipment based on the detection signals including the detection signal from the steam state detector.

Namely, with the above-described arrangement, the steam state detector detects a steam state (a pressure, a flow rate, etc.) in the steam pipe and in the operational state estimation unit, the operational state of the steam-using equipment is estimated based on the detection signals including the detection signal from the steam state detector. Thus, the operational state of the steam-using equipment can be estimated, based on more information relating to the operation of the steam-using equipment including the pressure or flow rate of the steam coming in/out of this steam-using equipment. With this, the suitability of the operational state of the steam-using equipment can be estimated even more accurately and also the early sensing of a sign of abnormality in the steam-using equipment can be made even more reliably.

According to one embodiment, preferably, there is provided a sub equipment state detector for detecting a state of a sub equipment accompanying the steam-using equipment;

the signal input unit inputs also a detection signal from the sub equipment state detector; and the operational state estimation unit estimates the operational state of the steam-using equipment based on the detection signals including the detection signal from the sub equipment state detector.

Namely, with the above-described arrangement, the sub equipment state detector detects a state of a sub equipment accompanying the steam-using equipment (an equipment operable in association with an operation of the steam-using equipment, an equipment assisting an operation of the steam-using equipment, etc.), and in the operational state estimation unit, the operational state of the steam-using equipment is estimated based on the detection signals including the detection signal from the sub equipment state detector. Thus, the operational state of the steam-using equipment can be estimated, based on more information relating to the operation of the steam-using equipment including a state of the sub equipment. With this, the suitability of the operational state of the steam-using equipment can be estimated even more accurately and also the early sensing of a sign of abnormality in the steam-using equipment can be made even more reliably.

According to one embodiment, preferably, there is provided an equipment state detector for detecting a state of the steam-using equipment;

the signal input unit inputs also a detection signal from the equipment state detector; and the operational state estimation unit estimates the operational state of the steam-using equipment based on the detection signals including the detection signal from the equipment state detector.

Namely, with the above-described arrangement, the equipment state detector detects a state of the steam-using equipment and in the operational state estimation unit, the operational state of the steam-using equipment is estimated based on the detection signals including the detection signal from the equipment state detector. Thus, the operational state of the steam-using equipment can be estimated, based on more information relating to the operation of the steam-using equipment including a state of the steam-using equipment per se. With this, the suitability of the operational state of the steam-using equipment can be estimated even more accurately and also the early sensing of a sign of abnormality in the steam-using equipment can be made even more reliably.

According to one embodiment, preferably, the operational state estimating means includes a storage unit for storing the detection signals inputted over time; and the operational state estimation unit utilizes history of a particular detection signal in estimating the operational state of the steam-using equipment.

Namely, with the above-described arrangement, the operational state of the steam-using equipment is estimated with utilization of history of a detection signal. Thus, the estimation of the operational state of the steam-using equipment is made possible from various viewpoints such as showing of an abnormal value by a certain detection signal under a steady state, showing of an abnormal value by the value of the detection signal beyond a predetermined period, showing of abnormal variation pattern different from that of the time of normal operation by the variation pattern of the detection signal, etc. With this, the suitability of the operational state of the steam-using equipment can be estimated even more accurately and also the early sensing of a sign of abnormality in the steam-using equipment can be made even more reliably.

According to one embodiment, preferably, the operational state estimation unit estimates the operational state of the steam-using equipment based on a change in detection result of the steam state detector starting from activation of the steam-using equipment.

Namely, with the above-described arrangement, from a change in the detection result of the steam state detector starting from activation of the steam-using equipment, it can be confirmed that steam has been fed without problem to the steam-using equipment, for example. In this way, the estimation of the operational state of the steam-using equipment is made possible, with focusing on the time of activation. With this, the suitability of the operational state of the steam-using equipment can be estimated even more accurately and also the early sensing of a sign of abnormality in the steam-using equipment can be made even more reliably.

According to one embodiment, preferably, the operational state estimating means includes an alarm unit for issuing a predetermined alarm when the operational state estimation unit senses abnormality in the operational state of the steam-using equipment.

Namely, with the above-described arrangement, by reporting sensed abnormality to a manager of the steam-using facility, a countermeasure against this abnormality can be taken timely in a reliable manner. Thus, the loss due to operation stop, operational loss associated with abnormality until countermeasure is taken, damage to the steam-using facility associated with abnormality in the steam-using equipment or the like described above can be reduced even more effectively.

According to one embodiment, preferably, the operational state estimation unit estimates a cause of abnormality based on one inputted detection signal or a preset particular combination of detection signals, when abnormality is sensed in the operational state of the steam-using equipment.

Namely, with the above-described arrangement, the operational state estimation unit estimates a cause of abnormality. Thus, this arrangement can eliminate the trouble for the manager of the steam-using facility to estimate a cause of abnormality after sensing of this abnormality. Wit this, abnormality can be coped with even more speedily. Thus, the loss due to operation stop, operational loss associated with abnormality until countermeasure is taken, damage to the steam-using facility associated with abnormality in the steam-using equipment or the like described above can be reduced even more effectively.

According to one embodiment, preferably, the operational state estimation unit generates countermeasure information for abnormality based on a cause of this abnormality.

Namely, with the above-described arrangement, the operational state estimation unit estimates countermeasure information for abnormality. Thus, this arrangement can eliminate the trouble for the manager of the steam-using facility to estimate countermeasure information for abnormality after sensing of this abnormality. Thus, the loss due to operation stop, operational loss associated with abnormality until countermeasure is taken, damage to the steam-using facility associated with abnormality in the steam-using equipment or the like described above can be reduced even more effectively.

According to one embodiment, preferably, the control state detector is configured to detect temperature or vibration of the steam controller.

According to one embodiment, preferably, the operational state estimation unit detects clogging or temperature change in the steam controller based on a detection signal from the control state detector and estimates the operational state of the steam-using equipment based on the clogging or temperature change in the steam controller.

According to one embodiment, preferably, the steam-using equipment generates drain in association with consumption of steam; and the steam controller is provided in an outlet pipe for discharging the drain generated in the steam-using equipment and discharges the drain generated in the steam-using equipment.

EMBODIMENTS

Figure 1:
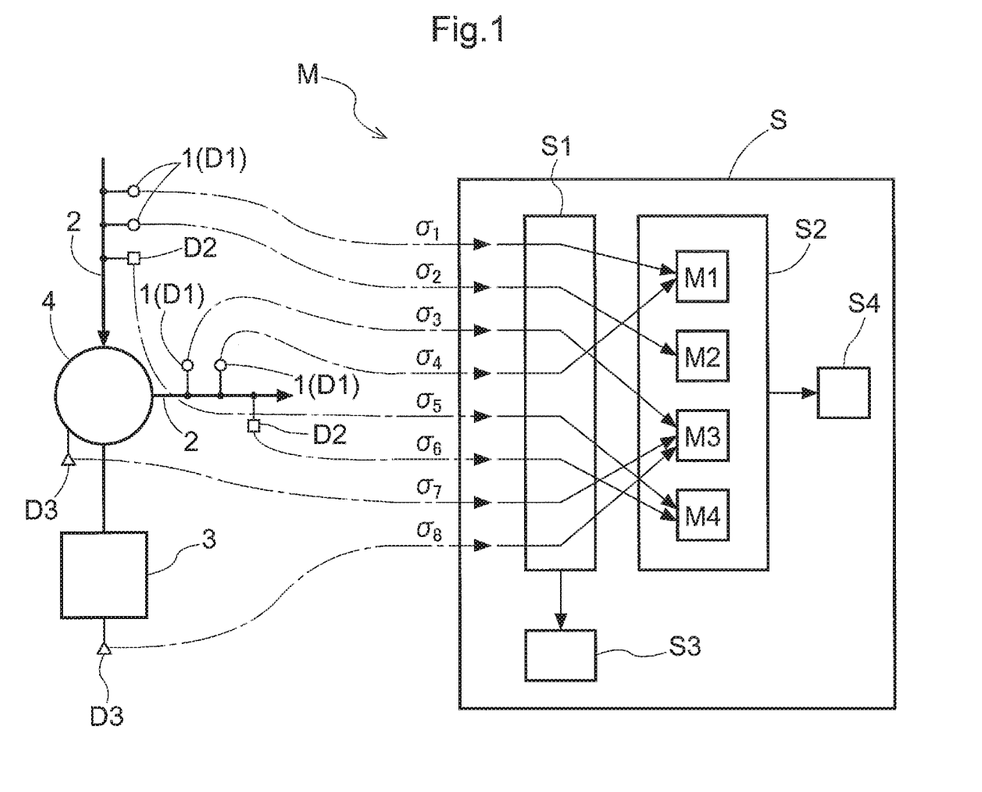
[FIG. 1] is a schematic view showing estimation of an operational state of a steam-using equipment,
[FIG. 2] is an explanatory view of a first embodiment,
[FIG. 3] is an explanatory view of a second embodiment,
[FIG. 4] is an explanatory view of a third embodiment,
[FIG. 5] is an explanatory view of a third embodiment, and
[FIG. 6] is an explanatory view of a fourth embodiment.

FIG. 1 shows a schematic of estimation of an operational state of a steam-using equipment by a steam-using facility monitoring system M relating to this disclosure. In particular, FIG. 1 shows a monitoring system for estimating an operational state of a steam-using equipment 4 accompanied by a steam pipe 2 having a steam controller(s) 1 (a steam trap, a valve, a strainer, etc.) and a sub equipment 3. Incidentally, the sub equipment 3 can be an equipment which operates in association with an operation of the steam-using equipment 4, an equipment which assists an operation of the steam-using equipment 4, etc., exemplified by a compressor or a pump connected with a steam turbine as the steam-using equipment 4.

Each steam controller 1 includes a control state detector D1 for detecting a state of the steam controller 1 included in the steam pipe 2. The steam pipe 2 incorporates a steam state detector D2 for detecting a steam state of the steam pipe 2. The sub equipment 3 and the steam-using equipment 4 respectively include an equipment state detectors D3 (an equipment state detector or a sub equipment state detector) for detecting a state of the sub equipment 3 or the steam-using equipment 4.

The monitoring system M consists essentially of the control state detector D1, the steam state detector D2, the equipment state detector D3, and an operational state estimating means S including a signal input unit S1 for inputting detection signals ($\sigma i$) from the respective state detectors D1-D3, an operational state estimation unit S2 that estimates the operational state of the steam-using equipment based on inputted detection signal ($\sigma i$), a storage unit S3 for storing detection signals ($\sigma i$) inputted over time, and an alarm unit S4 for issuing a predetermined alarm based on estimation result in the operational state estimation unit S2.

In this monitoring system M, detection signals ($\sigma 1$-$\sigma 4$) from the control state detector D1, detection signals ($\sigma 5$, $\sigma 6$) from the steam state detector D2, and detection signals ($\sigma 7$, $\sigma 8$) from the equipment state detector D3 are inputted to the signal input unit S1. And, with this monitoring system M, based on one of the inputted detection signals ($\sigma 1$-$\sigma 8$) or a preset particular combination of these detection signals ($\sigma 1$-$\sigma 8$), the operational state estimation unit S2 estimates an operational state of the steam-using equipment. For instance, as shown in FIG. 1, a monitoring item M1 comprised of a combination of the detection signals (σ1, σ4), a monitoring item M2 based on the detection signal (σ2), a monitoring item M3 comprised of a combination of the detection signals (σ3, σ7, σ8), and a monitoring item M4 comprised of a combination of the detection signals (σ5, σ6) are produced from the detection signals (σ1-σ8) and then based on these monitoring items M1-M4, an operational state of the steam-using equipment is estimated. When an abnormality is detected in the operational state of the steam-using equipment, the alarm unit S4 issues a predetermined alarm and also based on one inputted detection signal (σi) or a preset particular combination of detection signals (σi), cause of this abnormality is estimated and countermeasure information for the abnormality will be generated based on the abnormality cause.

The estimation of cause of abnormality and estimation of countermeasure information by the operational state estimation unit S2 can be made by storing in advance, in the storage unit S3, a correspondence table of monitoring items and abnormality causes, or a correspondence table of abnormality causes and countermeasures therefor, etc. and referring to such correspondence tables.

The estimation of cause of abnormality and estimation of countermeasure information by the operational state estimation unit S2 can be made also, when necessary, by utilizing history of a particular detection signal (σi) from the detection signals (σi) stored in the storage unit S3 or utilizing change in detection result of the control state detector D1 starting from activation of the steam-using equipment 4.

The alarm issued by the alarm unit S4 alarms a manager of the steam-using facility that an abnormality has been sensed in the operational state of the steam-using equipment. In particular, this is done by outputting, by an unillustrated outputting means, occurrence of sensing of abnormality in the operational state of the steam-using equipment or abnormality cause/countermeasure information or by transmitting occurrence of sensing of abnormality in the operational state of the steam-using equipment or abnormality cause/countermeasure information to the manager of the steam-using equipment or to a computer or a communication terminal of a managing provider, etc.

According to the monitoring system M relating to this disclosure, for estimation of an operational state of the steam-using equipment 4, the system employs a state of the steam controller 1 which controls a state of steam coming in/out of the steam-using equipment 4. By this, it is possible to estimate whether steam coming in/out of the steam-using equipment 4 is appropriate (its temperature, drain amount, etc.) or whether the steam-using equipment 4 is passing the steam appropriately or not. As a result, it becomes possible to determine e.g. whether the steam-using equipment 4 can continue its operation without any problem or whether continued operation thereof will present risk of inconvenience or not, etc. Thus, the suitability of the operational state of the steam-using equipment 4 can be estimated accurately. Further, as it is also possible to sense such abnormality of the steam controller 1 which precedes occurrence of inconvenience in the steam-using equipment 4, so that early and timely sensing of abnormality in the steam-using equipment 4 is made possible.

Next, such estimation of an operational state of the steam-using equipment by the steam-using facility monitoring system relating to this disclosure will be explained with reference to examples of first through fourth embodiments to be described next.

First Embodiment

Figure 2:
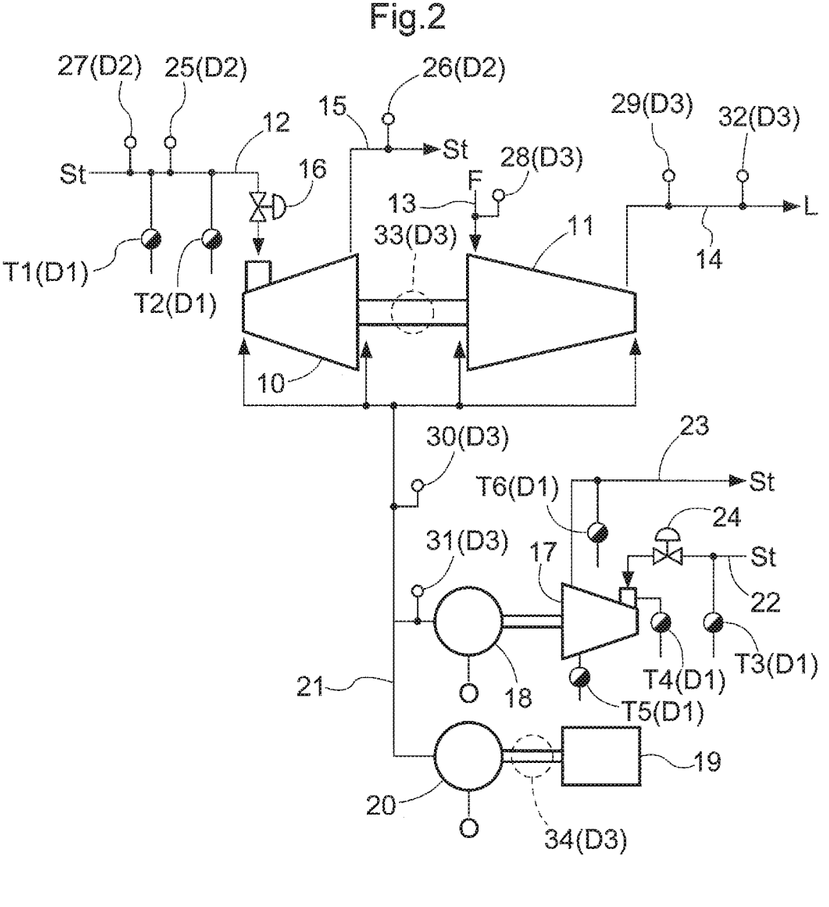

FIG. 2 shows an arrangement diagram showing periphery of a first steam turbine 10 as a steam-using equipment. This first steam turbine 10 is used for production of liquid fuel L by a compressor 11.

The first steam turbine 10 is connected to the compressor 11 acting as a sub equipment. In operation, as steam St is fed from a steam pipe 12 to the first steam turbine 10, the compressor 11 is driven. With this driving of the compressor 11, an amount of fuel gas F fed from a gas pipe 13 to the compressor 11 is compressed into the desired liquid fuel L. The produced liquid fuel L is discharged via a liquid fuel pipe 14. The steam St fed from a steam inlet pipe 12 to the first turbine 10 is discharged via a steam outlet pipe 15. Further, the amount of steam St fed to the first steam turbine 10 can be adjusted by an adjusting valve 16 as a steam controller.

The first steam turbine 10 and the compressor 11 are connected via a lubricant oil pipe 21 to a turbine pump 18 connected to a second steam turbine 17 as a steam-using equipment and a motor pump 20 driven by a motor 19. As steam St is fed to the second steam turbine 17 via a steam inlet pipe 22, the turbine pump 18 is driven. The steam St fed to the second turbine 17 via the steam inlet pipe 22 is discharged via a steam outlet pipe 23. With driving of these turbine pump 18 and motor pump 20, lubricant oil O is fed to the first steam turbine 10 and the compressor 11. With stable feeding of the lubricant oil O thereto, the first steam turbine 10 and the compressor 11 are driven smoothly.

Also, the feeding of the lubricant oil O to the first steam turbine 10 and the compressor 11 is done basically by the motor pump 20. When a feeding pressure of the lubricant oil O falls below a set value, the lubricant oil O is fed also by the turbine pump 18. Therefore, in the case of the feeding pressure of the lubricant oil O falling below the set value, through adjustment made by an adjusting valve 24 as a steam controller, the steam St by an amount required for a predetermined operation of the turbine pump 18 is fed to the second steam turbine 17. Incidentally, in case the feeding of the lubricant oil O is done by the motor pump 20 alone, too, through adjustment by the adjusting valve 24, the steam St by an amount for a slow-roll operation for warmup will be fed to the second steam turbine 17.

Incidentally, in this first embodiment, the steam inlet pipes 12, 22 and the steam outlet pipes 15, 23 correspond to the "steam pipe 2" illustrated in FIG. 1. The compressor 11, the gas pipe 13, the liquid fuel pipe 14, the turbine pump 18, the motor 19, the motor pump 20 and the lubricant oil pipe 21 correspond to the "sub equipments 3" illustrated in FIG. 1.

The steam inlet pipe 12 and the steam outlet pipe 15 for the first steam turbine 10 incorporate pressure gauges 25, 26 as the steam state detectors D2, which detect pressures of the steam passing through the respective sites. Further, the steam inlet pipe 12 for the first steam turbine 1 incorporates also a flow meter 27 as the steam state detector D2, which detects a flow rate of steam St passing there. The gas pipe 13 and the liquid fuel pipe 14 for the compressor 11 and the lubricant oil pipe 21 incorporate pressure gauges 28-31 as the equipment state detectors D3, which detect pressures of the fuel gas F, the liquid fuel L and the lubricant oil O flowing through the respective sites. Further, the liquid fuel pipe 14 for the compressor 11 incorporates a flow meter 32 as the equipment state detector D3 (a sub equipment state detector), which detects a flow rate of the liquid fuel L. Further, the rotational speed of the first steam turbine 10 is detected by a rotational speed meter 33 as the equipment state detector D3 (sub equipment state detector) connected to the first steam turbine 10. Also, the motor pump 20 incorporates a temperature vibration sensor 34 as the equipment state detector D3 (sub equipment state detector), which detects temperature or vibration of the motor pump 20. And, various information detected by these detectors 25-34 are transmitted to the operational state estimating means S.

The steam inlet pipe 12 and the steam outlet pipe 15 for the first steam turbine 10, the steam inlet pipe 22 and the steam outlet pipe 23 for the second steam turbine 17 and the second steam turbine 17 incorporate steam traps T1-T6 as steam controllers. And, the steam traps T1-T6 respectively incorporate the control state detectors (trap state detectors) D1 for detecting state information (temperature, vibration, etc.). The state information of the respective steam traps T1-T6 detected by the control state detectors D1 are transmitted to the operational state estimating means S.

In the monitoring system M, the detection signals transmitted from the control state detectors D1 or the detectors 25-34 are inputted to the signal input unit S1 of the operational state estimating means S and based on these inputted detection signals, the operational state estimation unit S2 effects estimation of the operational states of the first steam turbine 10 and the second steam turbine 17 as the steam-using equipments.

Monitoring items in the estimation of the first and second steam turbines 10, 17 include the following examples:

(1) checking of operations of the first steam turbine 10 and the compressor 2, based on the detection signals from the pressure gauge 25 and the flow meter 27 of the steam inlet pipe 12, the pressure gauge 26 of the steam outlet pipe 15, the pressure gauge 28 of the gas pipe 13, the pressure gauge 29 and the flow meter 32 of the liquid fuel pipe 14, and the rotational speed meter 33 of the first steam turbine 10;

(2) checking of an operation of the motor pump 20 based on the detection signal from the pressure gauge 30 of the lubricant oil pipe 21;

(3) checking of an operation of the turbine pump 18 based on the detection signal from the pressure gauge 31 of the lubricant oil pipe 21 at the time of operation of the turbine pump 18; and (4) checking of an operation of the motor 19 based on the detection signal from the temperature-vibration sensor 34 of the motor 19.

Further, this monitoring system M monitors such items as follows based on the detection signals from the control state detectors D1:

(5) checking whether the first steam turbine 10 is under a state standby for operation immediately or not (e.g. risk of occurrence of water hammering) by checking present/absence of drain accumulation in the steam traps T1 and T2 at the time of standby of the first steam turbine 10;

(6) checking risk of drain mixing in the steam to be fed to the first steam turbine by checking presence/absence of drain accumulation in the steam traps T1 and T2 during operation of the first steam turbine 10;

(7) confirming that steam has been fed to the first steam turbine 10 without any problem by checking whether the temperatures of the steam traps T1, T2 vary appropriately at the time of activation of the first steam turbine 10;

(8) checking whether the second steam turbine 17 is under a state standby for operation immediately or not (e.g. risk of occurrence of water hammering) by checking present/absence of drain accumulation in the steam traps T3-T6 at the time of standby of the second steam turbine 17;

(9) checking risk of drain mixing in the steam to be fed to the second steam turbine 17 by checking presence/absence of drain accumulation in the steam traps T3-T6 during operation of the second steam turbine 17;

(10) confirming that steam has been fed to the second steam turbine 17 without any problem by checking whether the temperatures of the steam traps T3-T6 vary appropriately at the time of activation of the second steam turbine 17; and (11) determining whether flow rate reduction in the liquid fuel L is attributable to the steam side or the gas side based on a turbine efficiency, by a turbine efficiency of the first steam turbine 10 based on input/output pressures of steam for the first steam turbine 10 obtained by the pressure gauges 25, 26 of the steam inlet pipe 12 and the steam outlet pipe 15 as the steam state detectors D2, the temperatures of steam of the steam traps T1 and T2 obtained by the control state detectors D1 and the rotational speed of the first steam turbine 10 obtained by the rotational speed meter 33 of the first steam turbine 10 as the equipment state detector D2, in case such flow rate reduction of the liquid fuel L is detected from the detection signal from the flow meter 32 of the liquid fuel pipe 14.

According to this monitoring system M, based on comprehensive judgment of the monitoring items (1) through (11) described above, estimations of the operational states of the first and second steam turbines 10, 17 are effected. In particular, in this monitoring system M, the estimations of the operational states of the first and second steam turbines 10, 17 use the detection signals from the control state detectors D1, so, the checking whether the steam-using equipment is under standby state for immediate activation, checking of risk of drain mixing of fed steam, checking of flow of steam at the time of activation of the steam-using equipment, estimation of cause of abnormality, etc. as shown by the monitoring items (5) through (11) above which are absent in the conventional art are made possible also.

Second Embodiment

Figure 3:
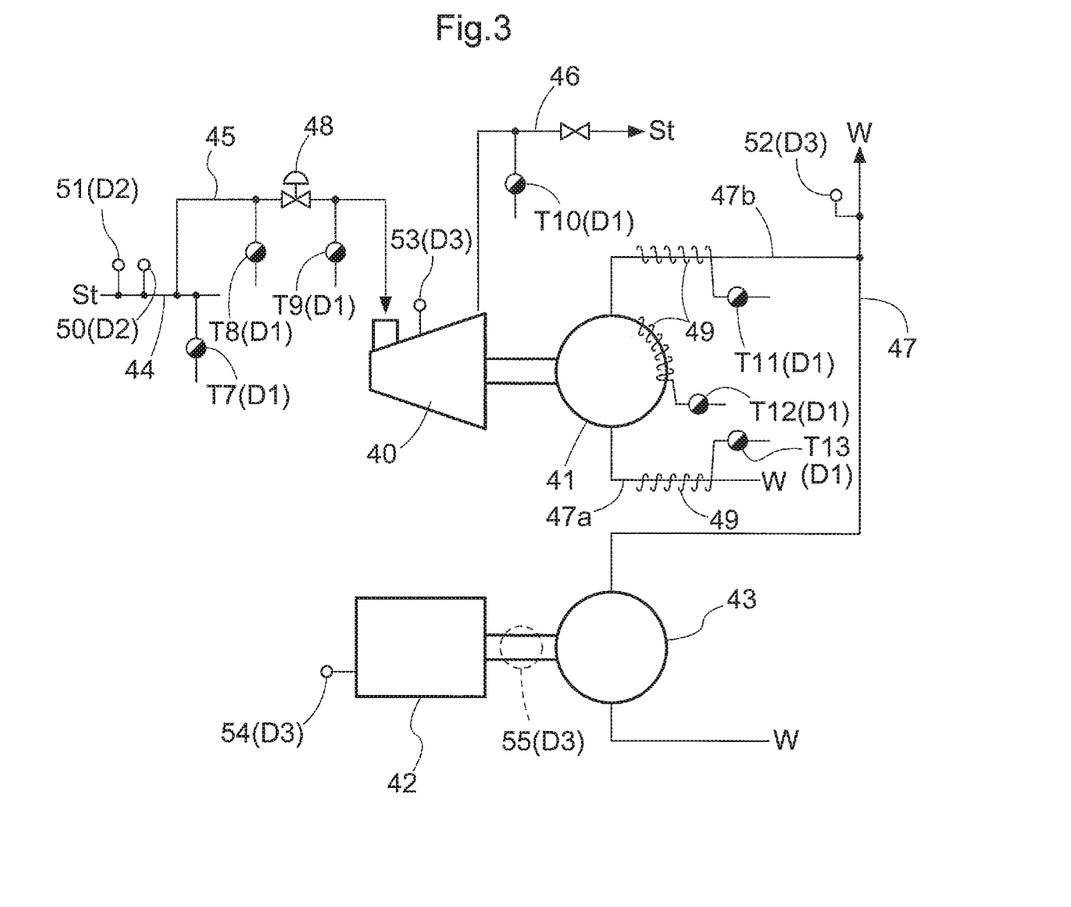

FIG. 3 shows an arrangement diagram showing periphery of a steam turbine 40 as a steam-using equipment Us. This steam turbine 40 is used for feeding of steam producing water to a waste heat boiler (not shown) in a steam-using facility.

The periphery of the steam turbine 40 is comprised of a turbine pump 41 connected to the steam turbine 40 and a motor pump 43 driven by a motor 42. The turbine pump 41 is driven with feeding of steam St to the steam turbine 40 from a steam inlet pipe 45 communicated to a main pipe 44. With driving of these turbine pump 41 and motor pump 43, steam-producing water W is fed to the waste heat boiler via a water feed pipe 47. The steam St fed to the steam turbine 40 via the steam inlet pipe 45 is discharged via a steam outlet pipe 46. The amount of steam St fed to the steam turbine 40 is adjustable by an adjusting valve 48 acting as a steam controller.

Feeding of steam-producing water W to the waste heat boiler is done basically by the motor pump 43. When a feeding pressure of the water W falls below a preset value, feeding of the water W is done additionally by the turbine pump 41. Therefore, only when the feeding pressure of the water W falls below the preset value, through adjustment by the adjusting valve 48, an amount of steam St needed for a predetermined operation of the turbine pump 41 is fed to the steam turbine 40. In case the feeding of water W is effected by the motor pump 43 alone, the feeding of steam St from the steam inlet pipe 45 is not effected. Incidentally, the steam turbine 40 is aerated by the steam St of the stem outlet pipe 46.

The turbine pump 41 and an inlet side water feed pipe 47a and an outlet side water feed pipe 47b for the turbine pump 41 respectively include a trace pipe 49 for passing the steam St for heat exchange with the respective sites. And, with repetition of feeding or blocking of feeding of the steam St to the trace pipe 49 as needed, the amount and the temperature of the steam St to be passed are varied, thereby to maintain the temperature of the water W passing therethrough at an appropriate temperature. Drain such as condensate or condensed water changed from the fed steam St and accumulated in the trace pipes 49 will be discharged by the steam traps T11-T13 incorporated in the respective trace pipes 49.

Incidentally, in this second embodiment, the steam inlet pipe 45 and the steam outlet pipe 46 correspond to the steam pipes 2 shown in FIG. 1; and the turbine pump 41, the motor 42, the motor pump 43, and the water feed pipe 47 correspond to the sub equipments 3 shown in FIG. 1. The trace pipes 49 act as the steam pipes 2 and also as the steam-using equipments 4.

The main pipe 44 incorporates a pressure gauge 50 and a flow meter 51 as the steam state detectors D2, and the pressure gauge 50 and the flow meter 51 detect a pressure and a flow rate of the steam St to be fed from the main pipe 44 to the steam inlet pipe 45. The water feed pipe 47 incorporates a pressure gauge 52 as an equipment state detector D3 (a sub equipment state detector), which detects a discharge pressure of the water W for steam production to be fed to the waste heat boiler. The steam turbine 40 incorporates a rotational speed meter 53 as an equipment state detector D3, which detects a rotational speed of the steam turbine 40. The motor 42 incorporates an ammeter 54 as an equipment state detector D3 (a sub equipment state detector), which detects a current value of the motor 42. Further, the motor 42 incorporates also a temperature vibration sensor 55 as an equipment state detector D3 (a sub equipment state detector), which detects a temperature or vibration of the motor 42. The various information detected by these detectors 50-55 are transmitted to the operational state estimating means S.

In addition to the trace pipes 49, the main pipe 44, and the steam inlet pipe 45 and the steam outlet pipe 46 for the steam turbine 40 too incorporate steam traps T (T7-T10); and the respective stream traps T (T7-T13) incorporate control state detectors (trap state detectors) D1 for detecting state information (temperature, vibration, etc.) The state information of the respective steam traps T detected by these control state detectors D1 are transmitted to the operational state estimating means S.

In the monitoring system M, the detection signals transmitted from the control state detectors D1 or the detectors 50-55 are inputted to the signal input unit S1 of the operational state estimating means S and based on these inputted detection signals, the operational state estimation unit S2 effects estimation of the operational state of the steam turbine 40 as the steam-using equipment.

Monitoring items in the estimation of the steam turbine 40 include the following examples:

(i) checking of operation of the steam turbine 40, based on the detection signals from the pressure gauge 50 and the flow meter 51 of the main pipe; and (ii) checking of an operation of the motor 42 and the motor pump 43, based on detection signals from the pressure gauge 52 of the water feed pipe 47, the ammeter 54 and the temperature vibration sensor 55 of the motor 42.

Further, in this monitoring system M, based on the detection signals from the control state detectors D1, monitoring items as follows are also monitored.

(iii) checking whether the steam turbine 40 is under a state standby for operation immediately or not (e.g. risk of occurrence of water hammering) by checking present/absence of drain accumulation in the steam traps T7-T10 at the time of standby of the steam turbine 40;

(iv) checking risk of drain mixing in the steam to be fed to the steam turbine 40 by checking presence/absence of drain accumulation in the steam traps T7-T10 during operation of the steam turbine 40;

(v) confirming that steam has been fed to the steam turbine 40 without any problem by checking whether the temperatures of the steam trap T9 varies appropriately at the time of activation of the steam turbine 40;

(vi) checking the risk of freezing of the water feed pipe 47 by checking the operation of the trace pipes 49 by checking presence/absence of drain accumulation in the steam traps T11-T13.

According to this monitoring system M, based on comprehensive judgment of the monitoring items (i) through (vi) described above, estimations of the operational state of the steam turbine 40 is effected. In particular, in this monitoring system M, the estimation of the operational state of the steam turbines 40 uses the detection signals from the control state detectors D1, so, the checking of the above-described monitoring items (iii)-(vi), i.e. whether the steam-using equipment is under standby state for immediate activation, checking of risk of drain mixing of fed steam, checking of flow of steam at the time of activation of the steam-using equipment, checking of the risk of freezing of the water feed pipe 47, etc. which are absent in the conventional art are made possible also.

Third Embodiment

Figure 4:
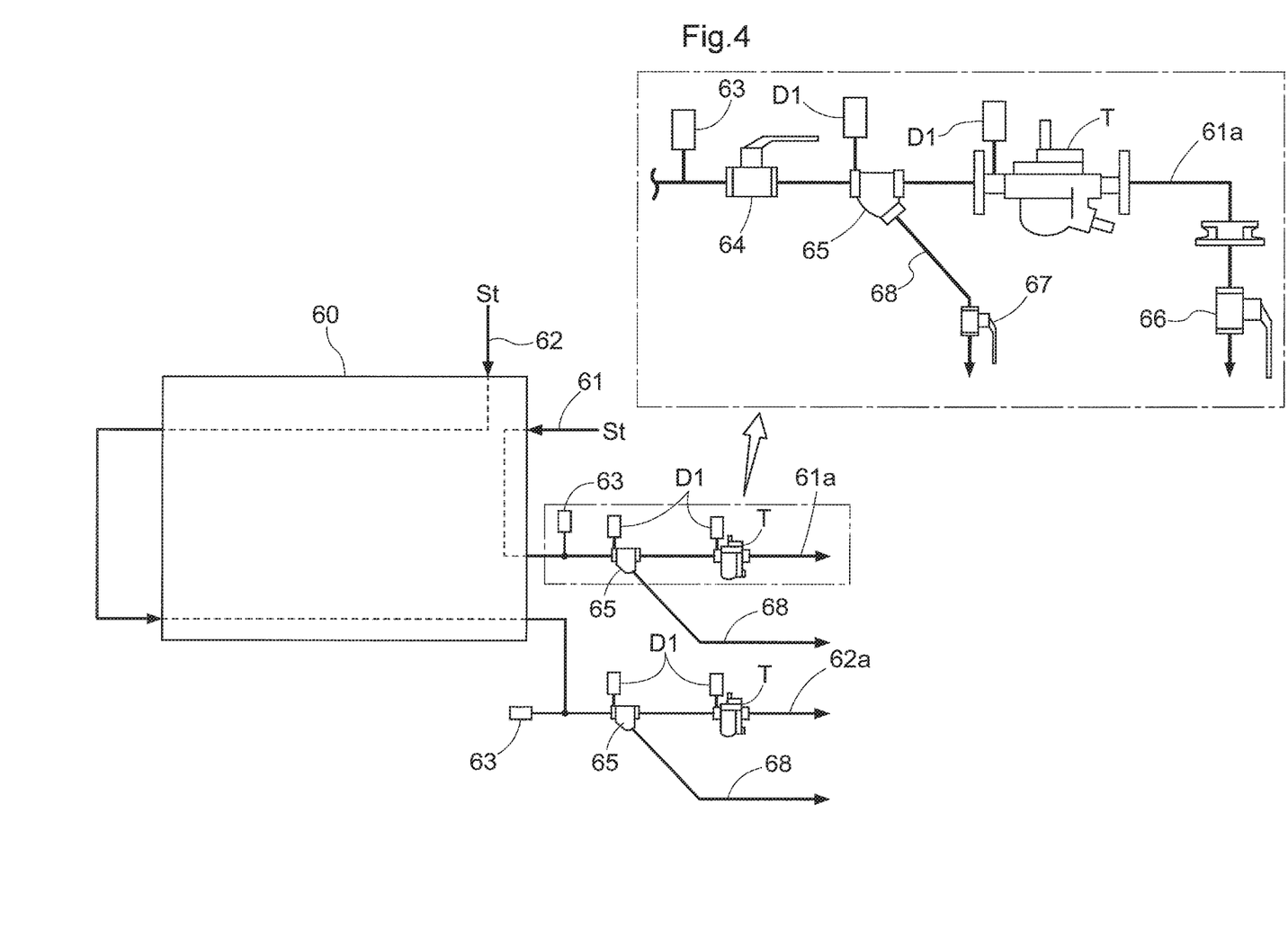

FIG. 4 shows an arrangement diagram showing periphery of a heater 60 as a steam-using equipment. As high-temperature steam flows through steam pipes 61, 62 extending in this heater 60, a heating object ("an object to be heated" not shown) is heated.

On an exit side 61a of the steam pipe 61 extending through the heater 60, in the order from the upstream side thereof, there are disposed temperature sensors 63, an upstream pipe 64, strainers 65, steam traps T, and a downstream pipe 66. The respective strainer 65 is connected with a discharge pipe 68 having a valve 67. Foreign substance collected by the strainer 65 is discharged via the discharge pipe 68. And, the strainers 65 and the steam traps T respectively incorporate a control state detector D1 for detecting state information (temperature, vibration, etc.) thereof. These state information of the respective steam traps T detected by the control state detectors D1 are transmitted to the operational state estimating means S. Incidentally, though not shown, on the exit side of the steam pipe 62 too, there is provided a similar arrangement to that on the exit side 61a of the steam pipe 61. Further, the respective steam pipes 61, 62 further include other unillustrated pressure gauges or flow meters.

According to the monitoring system M, the detection signals transmitted from the control state detectors D1 and the temperature sensor 63 provided in the strainers 65 and the steam traps T are inputted to the signal input unit S1 of the operational state estimating means S. Then, based on these inputted detection signals, the operational state estimation unit S2 effects estimation of the operational state of the heater 60 as a steam-using equipment.

In the heater 60, control of a steam amount or the like is effected to maintain its heating temperature constant. However, if a detected temperature from the temperature sensor 63 changes beyond an allowable range due to a certain problem, an alarm will be issued and the operation of the heater 60 will be stopped for safety and checking.

On the other hand, according to the monitoring system M relating to this disclosure, in the estimation of the operational state of the heater 60, detection signals of the control state detectors D1 of the strainers 65 and the steam traps T are employed. Therefore, a sign of abnormality in the operational state of the heater 60 can be sensed early from the strainers 65 and the steam traps T before detection of an abnormal temperature by the temperature sensor 63. With this, it becomes possible to cope with abnormality before stop of the operation of the heater 60 occurs.

Figure 5:
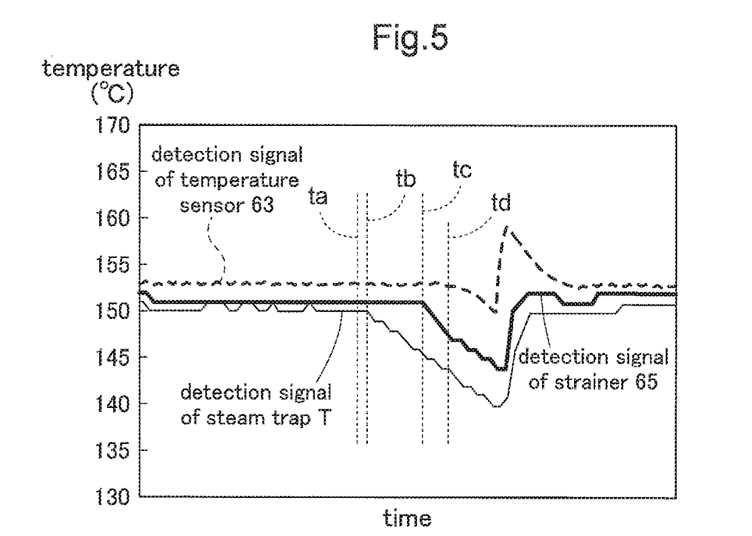

The above will be explained with showing an example thereof. Namely, FIG. 5 shows time changes in the detection signals from the control state detectors D1 and the temperature sensor 63 incorporated in the strainers 65 and the steam traps T in case clogging has occurred in the steam trap T. In FIG. 5, a mark (ta) represents a timing of occurrence of clogging in the steam trap T, a mark (tb) represents a timing of occurrence of a change in the steam trap T, a mark (tc) represents a timing of occurrence of a change in the strainer 65, and a mark (td) represents a timing of occurrence of sensing of low temperature abnormality from the temperature sensor 63. As may be apparent from FIG. 5, prior to the sensing of temperature abnormality from the detection signal from the temperature sensor 63, sign of certain abnormality can be sensed from change in the detection signals of the strainer 65 and the steam trap T. In particular, the detection signal of the steam trap T can sense the sign of abnormality immediately after the occurrence of clogging in the steam trap T.

Fourth Embodiment

Figure 6:
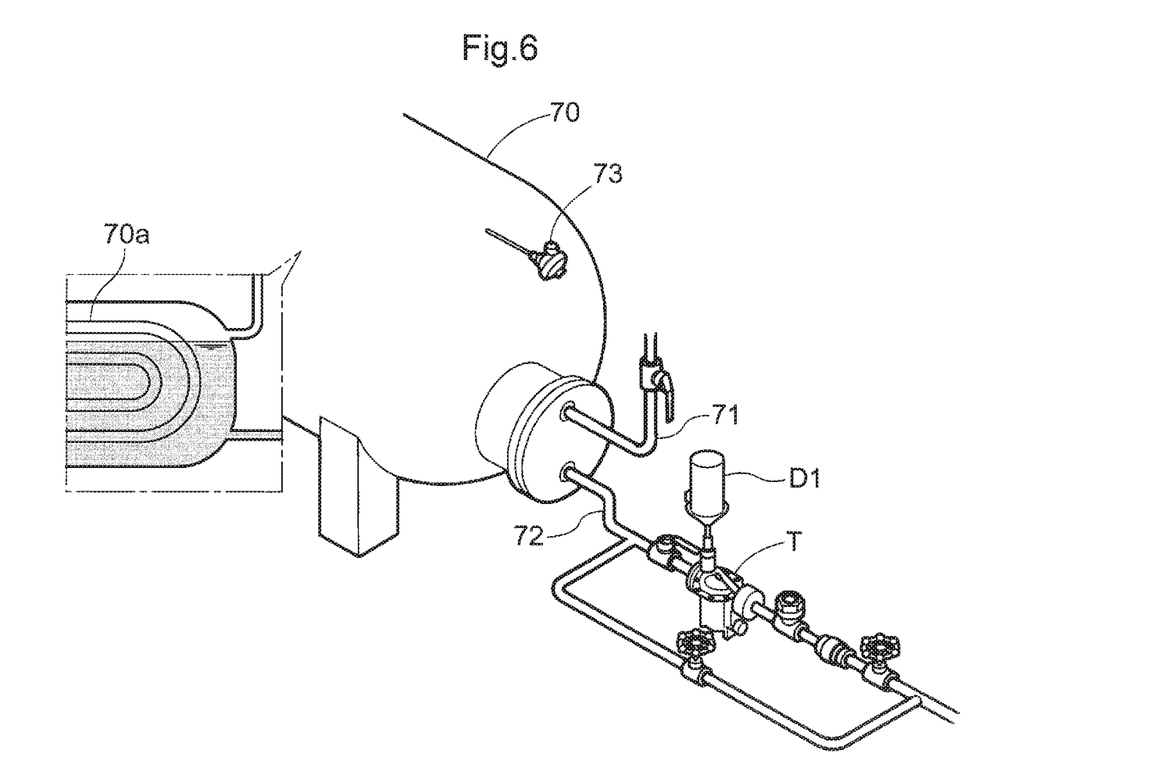

FIG. 6 shows an arrangement diagram showing periphery of a heat exchanger 70 as a steam-using equipment. As high-temperature steam is introduced to this heater exchange 70 via an inlet pipe 71, heat exchange is effected inside a heat exchanging unit 70a inside thereof. And, steam after the heat exchange is discharged via an outlet pipe 72 and drain generated from the heat exchange is discharged from the heat exchanger 70. The drain flowing in the outlet pipe 72 is discharged via the steam trap T provided in the outlet pipe 72. The steam trap T incorporates a control state detector (trap state detector) D1 for detecting state information (temperature, vibration, etc.). The state information of the steam trap T detected by this control state detector D1 is transmitted to the operational state estimating means S. Further, the heat exchanger 70 includes a temperature sensor 73 and a temperature detected by this temperature sensor 73 is transmitted also to the operational state estimating means S.

In the monitoring system M, the detection signals transmitted from the control state detector D1 and the temperature sensor 73 are inputted to the signal input unit S1 of the operational state estimating means S. Then, based on these inputted detection signals, the operational state estimation unit S2 estimates an operational state of the heat exchanger 70 as a steam-using equipment.

In the heat exchanger 70, if e.g. clogging has occurred in the steam trap T, drain flowing in the outlet pipe 72 will not be discharged effectively from the steam trap T. As a result, as shown in FIG. 6, the drain will be accumulated gradually inside the heat exchanger 70, which causes progressive decrease in the heat exchanging area in the heat exchanging unit 70a, thus impairing the heat exchange. And, if such drain accumulation is allowed to continue, this eventually may result in damage of the heat exchanger in the worst case.

If such drain accumulation as above occurs, temperature abnormality occurs in the heat exchanger 70 correspondingly, so that this temperature abnormality is detected by the temperature sensor 73. So, the occurrence of this drain accumulation inconvenience is sensed prior to damage of the heat exchanger 70. And, in the case of such sensing of temperature abnormality, there arises a need to stop the operation of the heat exchanger 70 in order to solve the drain accumulation. This is because the detection of temperature abnormality by the temperature sensor 73 is done not at the timing of occurrence of clogging in the steam trap T which is the cause of the drain accumulation, but after the drain accumulation has developed to a certain degree with lapse of a predetermined period after the clogging of the steam trap T.

On the other hand, according to the monitoring system M relating to this disclosure, in the estimation of the operational state of the heat exchanger 70 as a steam-using equipment, the detection signal of the control state detector D1 for detecting a state of the steam trap T is employed. Therefore, abnormality can be sensed at the timing of occurrence of clogging in the steam trap T, so a sign of abnormality in a steam-using equipment can be sensed early and timely.

Incidentally, the estimating means of an operational state of a steam-using equipment in the steam-using facility monitoring system relating to this disclosure is not limited to that shown in the first through fourth embodiments shown above, but can be configured appropriately in accordance with a steam-using facility of interest.

INDUSTRIAL APPLICABILITY

The steam-using facility monitoring system relating to this disclosure can be applied to monitoring of a variety of steam-using facilities.

DESCRIPTION OF REFERENCE MARKS/NUMERALS

M: monitoring system
D1: control state detector, trap state detector
D2: steam state detector
D3: equipment state detector, sub equipment state detector
σi: detection signal
S: operational state estimating means
S1: signal input unit
S2: operational state estimation unit
S3: storage unit
S4: alarm unit
1: steam controller
2: steam pipe
3: sub equipment
4: steam-using equipment
T: steam trap

The invention claimed is:

1. A steam-using facility monitoring system, comprising:
a control state detector that detects a state of a steam trap, wherein the steam trap is in a steam pipe external to a steam-using equipment that consumes steam from the steam pipe for turbine rotation, and wherein the control state detector is incorporated in the steam trap; and
an operational state estimating means having a signal input unit that inputs a detection signal from the control state detector and an operational state estimation unit that estimates an operational state of the steam-using equipment based on one inputted detection signal or a preset particular combination of detection signals,
wherein the operational state includes a risk of an inconvenience developing in the steam-using equipment with continued operation of the steam-using equipment.

2. The monitoring system according to claim 1, wherein the operational state estimating means includes an alarm that issues a predetermined alarm when the operational state estimation unit senses an abnormality in the operational state of the steam-using equipment.

3. The monitoring system according to claim 2, wherein the operational state estimation unit estimates a cause of the abnormality based on the one inputted detection signal or the preset particular combination of detection signals, when the abnormality is sensed in the operational state of the steam-using equipment.

4. The monitoring system according to claim 3, wherein the operational state estimation unit generates countermeasure information for the abnormality based on the cause of the abnormality.

5. The monitoring system according to claim 1, further comprising:
a steam state detector that detects a steam state in the steam pipe, wherein the signal input unit further inputs a detection signal from the steam state detector, and wherein the operational state estimation unit estimates the operational state of the steam-using equipment based on the preset particular combination of detection signals including the detection signal from the steam state detector and the detection signal from the control state detector.

6. The monitoring system according to claim 5, wherein the operational state estimation unit estimates the operational state of the steam-using equipment based on a change in the steam state detected by the steam state detector starting from an activation of the steam-using equipment.

7. The monitoring system according to claim 1, further comprising:
a sub equipment state detector that detects a state of a sub equipment accompanying the steam-using equipment, wherein the signal input unit further inputs a detection signal from the sub equipment state detector, and wherein the operational state estimation unit estimates the operational state of the steam-using equipment based on the preset particular combination of detection signals including the detection signal from the sub equipment state detector and the detection signal from the control state detector.

8. The monitoring system according to claim 1, further comprising:
an equipment state detector that detects a state of the steam-using equipment, wherein the signal input unit further inputs a detection signal from the equipment state detector, and wherein the operational state estimation unit estimates the operational state of the steam-using equipment based on the preset particular combination of detection signals including the detection signal from the equipment state detector and the detection signal from the control state detector.

9. The monitoring system according to claim 1, wherein the operational state estimating means includes a storage unit that stores the one inputted detection signal inputted over time or the preset particular combination of detection signals inputted over time, and wherein the operational state estimation unit estimates the operational state of the steam-using equipment based on (i) the stored one inputted detection signal inputted over time or (ii) the preset particular combination of detection signals inputted over time and the detection signal from the control state detector.

10. The monitoring system according to claim 1, wherein the control state detector detects a temperature or a vibration of the steam trap as the state of the steam trap.

11. The monitoring system according to claim 1, wherein the operational state estimation unit detects a clog or a temperature change in the steam trap based on the detection signal from the control state detector and estimates the operational state of the steam-using equipment based on the clog or the temperature change in the steam trap.

12. The monitoring system according to claim 1, wherein the steam-using equipment generates drain in association with consumption of steam, wherein the steam trap is in an outlet pipe for discharging the drain generated in the steam-using equipment, and wherein the steam trap discharges the drain generated in the steam-using equipment.

* * * * *